United States Patent [19]

Lindgren

[11] Patent Number: 4,471,563
[45] Date of Patent: Sep. 18, 1984

[54] INSECT TRAP

[75] Inventor: B. Staffan Lindgren, Vancouver, Canada

[73] Assignee: Canadian Patents & Development Limited, Ottawa, Canada

[21] Appl. No.: 421,842

[22] Filed: Sep. 23, 1982

[30] Foreign Application Priority Data

May 25, 1982 [CA] Canada ................................. 403667

[51] Int. Cl.³ ............................................. A01M 1/02
[52] U.S. Cl. .................................................... 43/122
[58] Field of Search .................. 43/118, 114, 122, 65, 43/121; 141/340, 341, 342, 343

[56] References Cited

U.S. PATENT DOCUMENTS

| 1,705,312 | 3/1929 | Rovano | 141/340 |
| 1,941,659 | 4/1932 | Coleman | 43/122 |
| 3,108,391 | 10/1963 | Sipos | 43/131 |
| 3,866,349 | 2/1975 | Meyer et al. | 43/114 |
| 4,316,344 | 2/1982 | Carlsen | 43/114 |

Primary Examiner—Nicholas P. Godici
Assistant Examiner—M. Jordan
Attorney, Agent, or Firm—Robert G. Hendry

[57] ABSTRACT

An insect trap for use in monitoring or suppressing flying insects, such as bark beetles. The trap comprises a plurality of conical members or funnels, and spacing members for spacing the funnels a predetermined distance when in use, and providing for nesting of the funnels for shipment or storage. Each of the funnels communicates with a funnel below and the lowermost funnel communicates with a collection container.

3 Claims, 7 Drawing Figures

INSECT TRAP

This invention relates to insect traps and, more particularly, to traps for monitoring or controlling the heavier flying insects, such as bark beetles.

As aggregation pheromones are isolated and synthesized for use as attractants in trapping species of scotytid beetles (bark beetles), efficient and easily handled traps are required for monitoring and suppression.

Present trapping systems are labour intensive and not compatible with forestry management practices with few exceptions. Traps covered with sticky substances are efficient but relatively labour intensive due to the fact that continued maintenance is required since the efficacy of the sticky surface is reduced as the load of dust, debris, and insects increases. Relatively inexpensive material costs are thus offset by the high labour costs. If the sticky screens are recycled, cleaning involves the use of toxic chemicals such as aromatic hydrocarbons. Trap logs are very efficient and are easily obtained but must be suitably aged. The logs are difficult to place and only work for a short period. After attack by the beetles, the logs are no longer as valuable and are used as pulp logs due to the damage caused by the beetles.

Another type of trap, commonly known as the drain pipe trap and consisting of a vertically disposed pipe having hundreds of holes therein, is relatively inefficient as the beetles must find and enter the holes. Drain pipe traps are easy to use but the mode of action is such that the phermone producing sex is often not caught, presumably because this sex does not find and enter the holes.

A further disadvantage of the known traps is that they are bulky and, therefore, require too much shipping and storage space.

It is, therefore, an object of the present invention to provide a trap which requires less labour.

A further object of this invention is the provision of a trap which requires only that the beetle bump into or land on the trap for the trap to be effective.

A still further object of the present invention is the provision of a trap which is lightweight, easily assembled, requires less storage space, and is relatively inexpensive to mass produce.

Another object of the present invention is the provision of a trap wherrein attractants can be positioned for greater effect.

Accordingly, the present invention provides a trap for use in trapping flying insects, said trap comprising at least two hollow, open-ended frusto-conical members, first means on an upper frusto-conical member for cooperating with means on a lower one of said members for spacing said members a predetermined distance when in use and providing for nesting of said members during storage; and a container positioned below said lower funnel and in communication therewith.

In the drawings which illustrate embodiments of the present invention,

Figure 1:
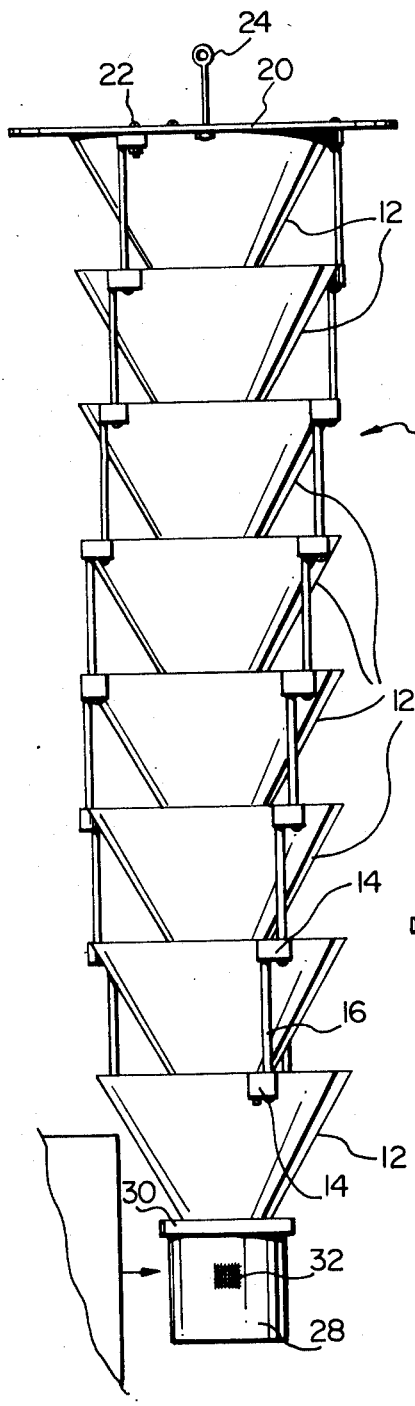
FIG. 1 is a side elevational view of the insect trap of this invention.
Figure 2:
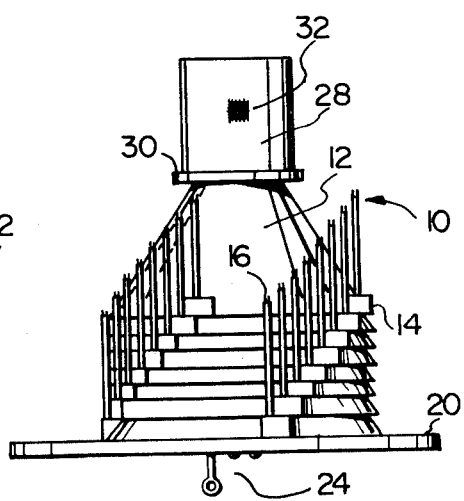
FIG. 2 is a side elevational view of the trap of FIG. 1 in the nested or stored condition.
Figure 3:
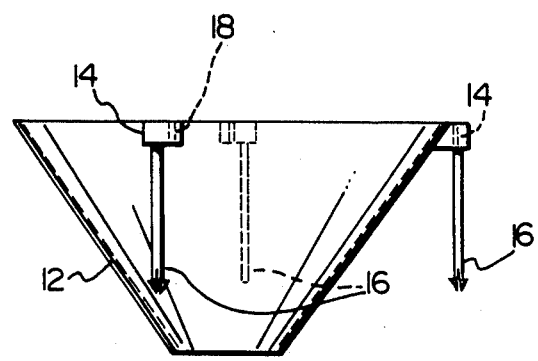
FIG. 3 is a side elevational view of one of the elements of the invention.
Figure 4:
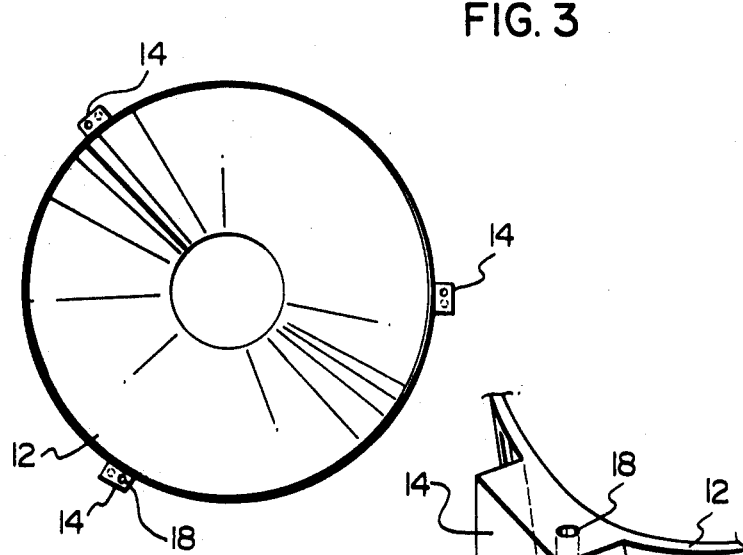
FIG. 4 is a top plan view of the element of FIG. 3.

Referring now in detail to the accompanying drawings, the trap shown generally at 10 in FIGS. 1 and 2, includes a plurality of hollow, open-ended, inverted frusto-conical members or funnels 12. Since the funnels 12 are identical, only one of the funnels need be described in detail. Accordingly, each of the frusto-conical members has three integrally molded blocks 14 adjacent an upper edge thereof, and each block 14 has a depending leg 16 (shown in FIGS. 3, 4 and 5). The legs 16 are received in bores 18 in the block 14 of the funnel beneath, with the exception of the lowermost funnel 12.

Figure 5:
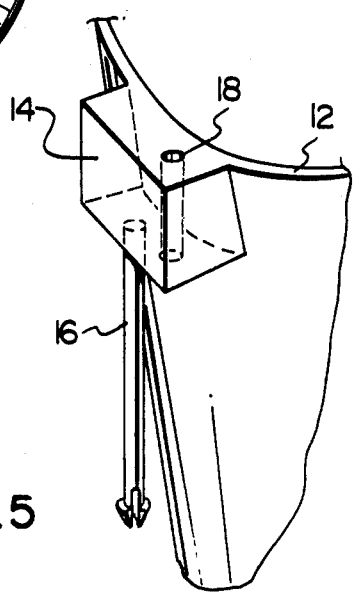
FIG. 5 is an enlarged partial perspective view of the interconnecting members of the element of FIG. 3.

As shown more clearly in FIG. 5, the legs 16 of the assembled funnel have their ends enlarged and bifurcated to form a barbed tip which can be pushed through the bore 18 to secure the funnels together.

The uppermost funnel 12 has a lid 20 secured thereto as by rivets 22 received in the bores 18. A centrally disposed eyelet 24 secured to the lid 20 serves to suspend the from a pole, tree branch or the like.

The lowermost funnel 12 has its lower portion in communication with a collection container 28.

The funnel 12 may be secured to an apertured lid 30 on the container 28. The container may be rotated so as to detach it from the lid 30 as well as the trap assembly 10. The container 28 has an aperture 32 which is covered with suitable mesh to provide drainage when necessary.

As shown in FIG. 2, the trap 10 is conveniently nested for shipment or storage as the legs 16 are adapted to slide through the blocks 14 of the adjacent funnel 12.

The dimensions of the trap 10 are dictated by the type of beetle to be trapped and would be determined by one skilled in the art. However, it has been found that, for example, a trap for use in trapping bark beetles could have funnels 8-inches in diameter at their upper rims, which are spaced approximately 2 to 5 inches apart. The angle of the inside funnel wall should be approximately 30° to 50° from the axis of the funnel.

Figure 7:
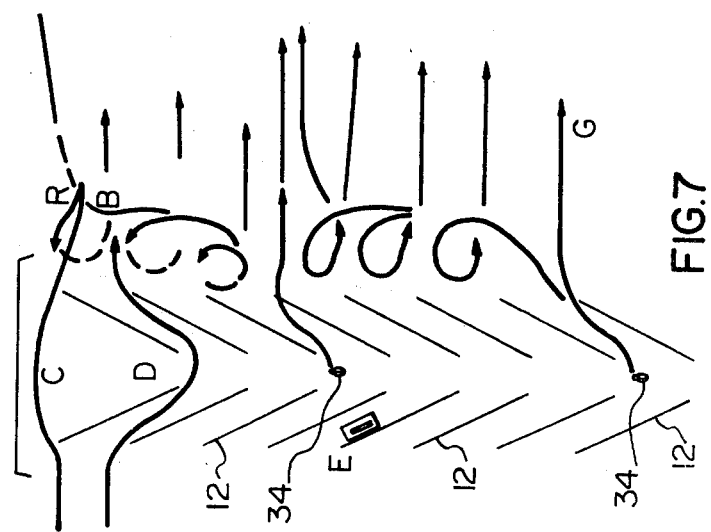
FIG. 7 is a diagrammatic illustration of the disposition of the pheromone attractant for increased effectiveness.

The preferred placement pheromone containers 34 is shown in FIG. 7, to provide dispersion of the phermone as illustrated by the arrows, over substantially the entire length of the trap 10.

Figure 6:
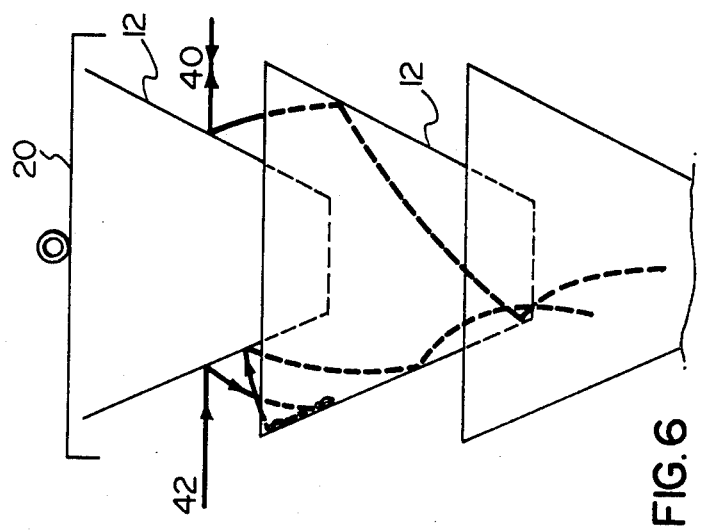
FIG. 6 is a diagrammatic representation of the flight path of a beetle coming in contact with the trap.

FIG. 6 illustrates the probable flight paths of insects 40 and 42 striking the funnel 12. The insect 40, in this case a beetle, and a poor flyer, attempts to land on the inverted surface of the funnel 12 but fails and falls into the funnel beneath, which prevents resumption of flight. Since the target insects, in this case, beetles, fold their wings on contact with the walls of the funnels and, on falling they make repeated contact with the walls of the funnels, they will not usually open their wings to resume flight. Insect 40 makes such repeated contact with the walls of the funnels and thus falls through the trap into container 28. Similarly, the beetle 42 fails to land but is able to maintain its footing on the inside wall of the lower funnel 12. However, attempts to take off again are unsuccessful in most cases, because the beetle strikes the upper funnel and tends to bounce further down into the trap and into the container 28.

The trap 10 requires minimum maintenance since the only requirement is that the pheromones be replaced and that the container 28 be emptied. In this regard, if sodium chloride is used in the container 28, the odor of decaying beetles will not decrease the effectiveness of the trap.

It will also be appreciated that the multiple funnel trap 10 requires only attempted landing by the insect. The design is specifically aimed at "heavy" flyers, making it selective for beetles to a large extent. The number of funnels are required to create the image of a vertical silhouette, making the trap further selective for insects that utilize trees as host material for their brood. However, other insects may be caught occasionally, since the trap may be used as a resting site.

What is claimed is:

1. A frusto-conical member for use in an insect trap consisting of a plurality of identical frusto-conical members arranged one above the other and communicating with a collection container secured to a lowermost member, each said frusto-conical member comprising a hollow openended body, a larger end of which is provided with a plurality of flanges, each flange has a depending leg and an aperture so dimensioned and positioned that the legs of one conical member are adapted to be received in apertures of the flange in a member therebelow.

2. A frusto-conical member for use in an insect trap consisting of a plurality of said members as claimed in claim 1 including a lid over an open upper end of an uppermost one of said frusto-conical members.

3. A frusto-conical member for use in an insect trap consisting of a plurality of said members as claimed in claim 2 wherein pheromones are placed in the interior of said trap adjacent a midportion and adjacent a lower end.

* * * * *